(12) United States Patent
Banning et al.

(10) Patent No.: US 7,034,185 B2
(45) Date of Patent: Apr. 25, 2006

(54) COLORANT PRECURSOR COMPOSITIONS

(75) Inventors: Jeffery H. Banning, Hillsboro, OR (US); Donald R. Titterington, Newberg, OR (US); Clifford R. King, Hendersonville, NC (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/422,755

(22) Filed: Apr. 24, 2003

(65) Prior Publication Data

US 2004/0215038 A1 Oct. 28, 2004

(51) Int. Cl.
   *C07C 271/02* (2006.01)
(52) U.S. Cl. .................. 564/443; 560/25; 560/26; 560/157; 560/158
(58) Field of Classification Search ............... 564/443
   See application file for complete search history.

(56) References Cited

U.S. PATENT DOCUMENTS

| | | | |
|---|---|---|---|
| 3,653,932 A | 4/1972 | Berry et al. | 106/22 |
| 3,994,835 A | 11/1976 | Wolf et al. | 260/2.5 |
| 4,132,840 A | 1/1979 | Hugl et al. | 521/167 |
| 4,249,902 A | 2/1981 | Kruckenberg et al. | |
| 4,284,729 A | 8/1981 | Cross et al. | 521/158 |
| 4,292,239 A | 9/1981 | Kruckenberg et al. | |
| 4,390,369 A | 6/1983 | Merritt et al. | 106/31 |
| 4,400,320 A | 8/1983 | Keller et al. | 260/158 |
| 4,484,948 A | 11/1984 | Merritt et al. | 106/31 |
| 4,507,407 A | 3/1985 | Kluger et al. | 521/113 |
| 4,594,454 A | 6/1986 | Moore et al. | 564/305 |
| 4,601,725 A | 7/1986 | Keller et al. | |
| 4,627,939 A * | 12/1986 | Moore et al. | 554/110 |
| 4,658,064 A | 4/1987 | Moore et al. | 564/443 |
| 4,684,956 A | 8/1987 | Ball | 346/1.1 |
| 4,751,254 A | 6/1988 | Kluger et al. | 521/163 |
| 4,846,846 A | 7/1989 | Rekers et al. | 8/515 |
| 4,851,045 A | 7/1989 | Taniguchi | 106/31 |
| 4,889,560 A | 12/1989 | Jaeger et al. | 106/27 |
| 4,889,761 A | 12/1989 | Titterington et al. | 428/195 |
| 4,912,203 A | 3/1990 | Kluger et al. | 534/729 |
| 4,981,516 A | 1/1991 | Kluger et al. | 106/22 |
| 5,006,170 A | 4/1991 | Schwarz et al. | 106/20 |
| 5,043,013 A | 8/1991 | Kluger et al. | 106/22 |
| 5,082,938 A | 1/1992 | Kluger et al. | 544/38 |
| 5,108,460 A | 4/1992 | Hines et al. | 8/403 |
| 5,151,120 A | 9/1992 | You et al. | 106/27 |
| 5,182,372 A | 1/1993 | Derber et al. | |
| 5,221,335 A | 6/1993 | Williams et al. | 106/23 |
| 5,266,227 A | 11/1993 | Reichelt et al. | |
| 5,270,363 A | 12/1993 | Kluger et al. | 524/90 |
| 5,290,921 A | 3/1994 | Moody et al. | 534/607 |
| 5,372,852 A | 12/1994 | Titterington et al. | 427/288 |
| 5,456,725 A | 10/1995 | Bruhnke | 8/403 |
| 5,496,879 A | 3/1996 | Griebel et al. | 524/320 |
| 5,591,833 A | 1/1997 | Hines et al. | 534/607 |
| 5,621,022 A | 4/1997 | Jaeger et al. | 523/161 |
| 5,864,002 A | 1/1999 | Stephens et al. | 528/77 |
| 5,919,839 A | 7/1999 | Titterington et al. | 523/161 |
| 5,994,546 A | 11/1999 | Kimura et al. | |
| 2003/0061964 A1 | 4/2003 | Batlaw | 106/31.27 |

FOREIGN PATENT DOCUMENTS

| | | |
|---|---|---|
| EP | 0187352 | 7/1986 |
| EP | 0206286 | 12/1986 |
| FR | 2 359 881 A | 2/1978 |
| GB | 1 577 842 | 10/1980 |
| WO | WO 94/04619 | 3/1994 |
| WO | WO 97/13816 | 4/1997 |

OTHER PUBLICATIONS

Database CAPLUS on STN, Acc. No. 1977:469720, Peters et al., Journal of the Society of Dyers and Colourists (1977), 93(4), p. 126-33 (abstract).*
Database CAPLUS on STN, Acc. No. 1978:154333, Kruckenberg, DE 2633765 A1 (Feb. 2, 1978) (abstract).*
Copending U.S. Appl. No. 10/422,897, filed concurrently herewith, entitled "Colorant Compositions," by Jeffery H. Banning et al.
Copending U.S. Appl. No. 10/422,895, filed concurrently herewith, entitled "Colorant Compositions," by Jeffery H. Banning et al.
Copending U.S. Appl. No. 10/422,742, filed concurrently herewith, entitled "Colorant Compositions," by Jeffery H. Banning et al.
English abstract for DE 4205636AL.
English abstract for DE 4205713AL.
J. Miley, "Polymeric Colorants," *IUPAC Pure and Applied Chemistry*, vol. 68, No. 7, p. 1423 (1996).
Hartmann G., Colloids and Surfaces, 57(3-4), 205-217, 1991.

* cited by examiner

*Primary Examiner*—Brian Davis
(74) *Attorney, Agent, or Firm*—Judith L. Byorick

(57) ABSTRACT

Disclosed are colorant precursor compounds of the formula

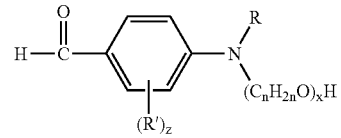

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said colorant precursor has no more than one —OH, —SH, or primary or secondary amino group per molecule.

27 Claims, No Drawings

COLORANT PRECURSOR COMPOSITIONS

CROSS-REFERENCES TO COPENDING APPLICATIONS

Copending application U.S. Ser. No. 10/422,897, filed concurrently herewith, entitled "Colorant Compositions" with the named inventors Jeffery H. Banning, Donald R. Titterington, and Clifford R. King, the disclosure of which is totally incorporated herein by reference, discloses colorant compounds of the formula

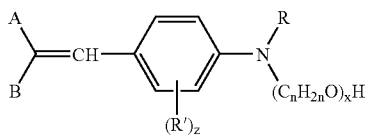

wherein R is an alkyl group, an aryl group an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, x is an integer representing the number of repeat alkylene oxide units, and A and B each, independently of the other, are hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups, alkoxy groups, aryl groups, aryloxy groups, arylalkyl groups, arylalkyloxy groups, alkylaryl groups, or alkylaryloxy groups, wherein said colorant has no more than one —OH, —SH, or primary or secondary amino group per molecule.

Copending application U.S. Ser. No. 10/422,895, filed concurrently herewith, entitled "Colorant Compositions," with the named inventors Jeffery H. Banning, Donald R. Titterington, and Clifford R. King, the disclosure of which is totally incorporated herein by reference, discloses colorant compounds of the formula

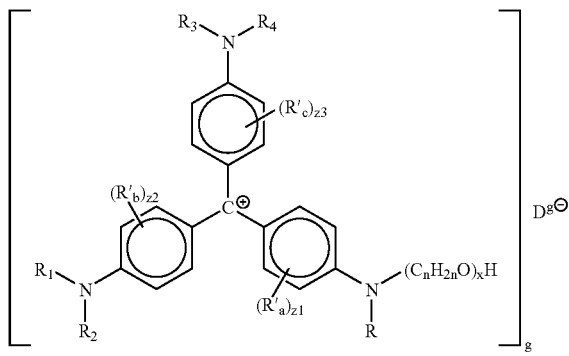

wherein R, $R_1$, $R_2$, $R_3$, and $R_4$ each, independently of the others, is an alkyl group, an aryl group, an arylalkyl group, or an alkylaryl group, and wherein R, $R_1$, $R_2$, $R_3$, and $R_4$ each can be joined to a phenyl moiety to form a ring, each $R'_a$, $R'_b$, and $R'_c$, independently of the others, is a halogen atom, an alkyl group, an alkoxy group, a nitrile group, a nitro group, an amide group, or a sulfonamide group, z1, z2, z3 each, independently of the others, is an integer of 0, 1, 2, 3, or 4, n is an integer representing the number of carbon atoms in each repeat alkylene oxide unit x is an integer representing the number of repeat alkylene oxide units, D is an anion, and g is the charge on the anion, wherein said colorant has no more than one —OH, —SH, or primary or secondary amino group per molecule.

Copending application U.S. Ser. No. 10/422,742, filed concurrently herewith, entitled "Colorant Compositions," with the named inventors Jeffery H. Banning, Donald R. Titterington, and Clifford R. King, the disclosure of which is totally incorporated herein by reference, discloses colorant composition of the formula

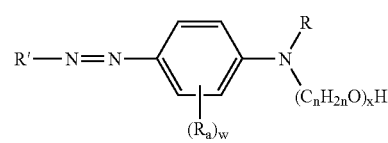

wherein R is an alkyl group, an aryl group, an arylalkyl group, or an alkylaryl group, and wherein R can be joined to the phenyl moiety to form a ring, R' is an aromatic- or heteroaromatic-containing group, each $R_a$, independently of the others, is a halogen atom, an alkyl group, an alkoxy group, a nitrile group, a nitro group, an amide group, or a sulfonamide group, w is an integer of 0, 1, 2, 3, or 4, n is an integer representing the number of carbon atoms in each repeat alkylene oxide unit and x is an integer representing the number of repeat alkylene oxide units, wherein sold colorant has no more than one —OH, —SH, or primary or secondary amino group per molecule.

BACKGROUND OF THE INVENTION

The present invention is directed to specific colorant precursor compounds. More specifically, the present invention is directed to specific reactive formyl aniline colorant precursor compounds. One embodiment of the present invention is directed to a colorant precursor compound of the formula

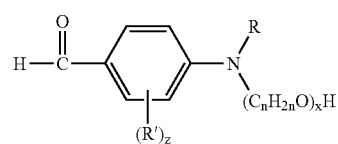

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said colorant precursor has no more than one —OH, —SH, or primary or secondary amino group per molecule. Another embodiment of the present invention is directed to a compound comprising two or more moieties of the formula

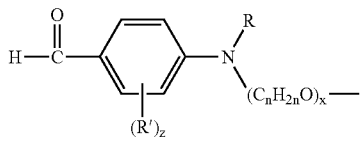

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, Ian amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer.

In general, phase change inks (sometimes referred to as "hot melt inks") are in the solid phase at ambient temperature, but exist in the liquid phase of the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,864,002 (Stephens et al.), the disclosure of which is totally incorporated herein by reference, discloses a method of providing for manufacturing a colored polymer resin having the steps of: (a) blending a disazo colorant into a mixture of monomers, the colorant having a poly(oxyalkylene) substituent comprising from 2 to 200 alkylene oxide residues, bonded to each end of the disazo chromophore, the poly(oxyalkylene) substituent having a nucleophilic terminal group which is capable of reacting with at least a portion of the monomers; (b) providing conditions under which the monomers and disazo colorant polymerize to form a colored polymer resin.

U.S. Pat. No. 5,591,833 (Hines et al.), the disclosure of which is totally incorporated herein by reference, discloses colorants and compositions useful as a fugitive or permanent colorant for a variety of substrates, or as intermediates for their manufacture, and having one or more improved properties of enhanced aqueous washability, compatibility with and non-extractibility from thermoplastic resins, or reactivity with resins having reactive functionality, said composition having the formula $C(Z)_{1-8}$ wherein C is the residue of a reactant having from 1 to 8 nucleophilic site residues to which the Z moieties are attached; said Z moieties containing at least about 60 weight percent of poly(oxyalkylene) which comprises (a) at least one glycidol residue segment of 2 to 6 glycidol residues attached to a nucleophilic site of C, wherein said poly(oxyalkylene) contains a total of from 2 to 20 glycidol residues, (b) and wherein said poly(oxyalkylene) further contains the residues of one or more other epoxide reactants of ethylene oxide (EO), propylene oxide (PO), or butylene oxide (BO), or mixtures thereof, wherein said poly(oxyalkylene) contains a total of from about 10 to about 600 of said EO, PO, or BO residues, or mixtures thereof, at least about 75 mole percent of which are EO residues, (c) and with the provisions that the ratio of the total of —O—PO— and —O—BO— linkages of all glycidol residues to the total of all functional oxy linkages of said glycidol residues is less than one, and the molar ratio of EO residues to glycidol residues is from 4 to 75.

U.S. Pat. No. 5,290,921 (Moody et al.), the disclosure of which is totally incorporated herein by reference, discloses primary hydroxyl enhanced colorants having markedly improved reactivities in. e.g., polyurethane foams for imparting permanent coloring thereto, the colorants having the formula C-(Z)$^{1-4}$ wherein C is an azo, methine, or azamethine chromogen and Z is a poly(oxyalkylene) moiety comprising (1) at least two (A) units independently selected from those of the formulae —$CH_2CH(O\text{-}T)CH_2O$— or —$CH_2CH(O\text{-}T)CH_2O\text{-}T$ and (2) from none to about 200 (B) units of the formula (—RO—) wherein R is straight or branched chain hydrocarbon of 2 to 4 carbons, T is a moiety of the formula —$CH_2CH(R_1)$—O—$(RO)_{0-40}$—$CH_2CH_2OH$ wherein $R_1$ is selected from unsubstituted or substituted alkyl, aryl, alkenyloxyalkyl, alkoxyalkyl, or aryloxyalkyl, and wherein the A units comprise at least 0.5 percent of the total A+B units.

U.S. Pat. No. 5,108,460 (Hines et al.), the disclosure of which is totally incorporated herein by reference, discloses azo chromophores having polyoxyalkylene substituents that are linked together by a covalent bond or by an intervening connecting group to form dimers or trimers. The polyoxyalkylene substituents are straight or branched chain polymers primarily of ethylene oxide which make the dimer and trimer colorants useful as fugitive tints.

U.S. Pat. No. 5,082,938 (Kluger et al.), the disclosure of which is totally incorporated herein by reference, discloses enhanced branched chain hydroxyl compounds of formula Y-(Z)$_{1-6}$ wherein Y is the residue of a nucleophile devoid of conjugated divalent linking moieties, and each Z is a poly (oxyalkylene) moiety having a molecular weight of from about 200 to 10,000 and containing at least one glycidol residue, wherein at least one of the primary oxy sites of said glycidol residue is linked preferably directly to a first epoxide residue of three or more carbons, and wherein said first epoxide residue is linked through a secondary oxy site preferably directly to a second epoxide reside having a primary terminal hydroxyl.

U.S. Pat. No. 5,043,013 (Kluger et al.), the disclosure of which is totally incorporated herein by reference, discloses a washable aqueous ink composition having a viscosity of from about 1.0 to about 6.0 centipoise and containing from about 10 to about 50 percent by weight of one or more polymeric colorants of the formula

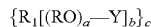

wherein X is a polar group such as sulfonic acids, sulfonic acid salts, sulfonamides, sulfonates or the like; R is alkylene; Y is H, alkanoyl, carbamoyl, or the like; $R_1$ is nitrogen, oxygen, sulfur, or a sulfur-containing divalent linking group; a is an integer of from six to about forty; b and c are each independently selected from one or two; d is an integer of from one to four; the product of (a) (b) (c) is an integer of from 6 to about 40; and CHROM is a chromophore such as nitro, nitroso, monoazo, disazo and trisazo, diarylmethane, triarylmethane, xanthane, acridine, methine, thiazole, indamine, azine, oxazine, or anthraquinone, wherein the (RO)$_a$ moiety is bonded to a carbocyclic aromatic ring of the (CHROM) through $R_1$.

U.S. Pat. No. 4,751,254 (Kluger et al.), the disclosure of which is totally incorporated herein by reference, discloses a process for coloring polyurethane resins during the production of same with reactive colorants derived from polyalkoxytrifluoroaniline intermediates. These colorants impart increased brightness in shade for both aromatic and heteroaromatic derivatives and increased resistance to stannous octanoate catalyst over conventional polymeric colorants derived for heteroaromatic compounds. These colorants have the structure

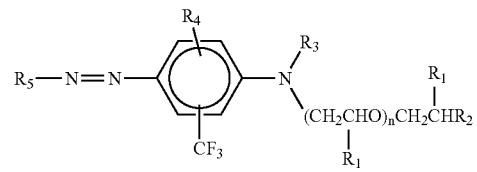

wherein $R_1$ is selected from H, a lower alkyl group containing from 1 to about 10 carbon atoms, $CH_2Cl$, $CH_2OH$, phenyl, or

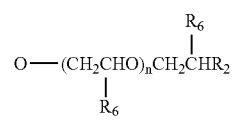

where $R_6$ is H or a lower alkyl group containing from 1 to about 9 carbon atoms; $R_2$ is selected from OH, $NH_2$, or SH; $R_3$ is selected from a lower alkyl group containing from 1 to about 9 carbon atoms, cyanoalkyl, acetoxyalkyl, or

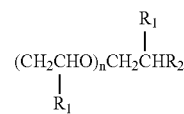

where $R_1$ and $R_2$ are as given above; $R_4$ is H, $CF_3$, a lower alkyl group containing from 1 to about 9 carbon atoms, Cl, or Br and n is 0 or an integer from 1 to about 125. $R_5$ is an aromatic or heteroaromatic being characterized as having improved brightness and which have functionality through reactive substituents thereof.

U.S. Pat. No. 4,658,064 (Moore et al.), the disclosure of which is totally incorporated herein by reference, discloses a compound of the formula

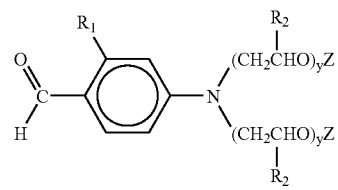

wherein $R_1$ is selected from alkyl, halide, or alkoxy; $R_2$ is selected from H or alkyl; Y is a number of from 2 to about 200; and Z is selected from H or

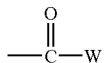

where W is alkyl.

U.S. Pat. No. 4,594,454 (Moore et al.), the disclosure of which is totally incorporated herein by reference, discloses a compound of the formula

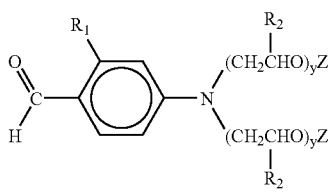

wherein $R_1$ is selected from alkyl, halide, or alkoxy; $R_2$ is selected from H or alkyl; Y is a number of from 2 to about 200; and Z is selected from H or

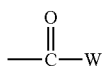

where W is alkyl.

U.S. Pat. No. 4,400,320 (Keller et al.), the disclosure of which is totally incorporated herein by reference, discloses fugitive tints which are characterized by the formula

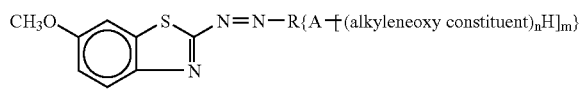

where R is selected from meta-toluidene, meta-amino phenol, aniline, or dimethoxy aniline, A is selected from N, O, S, or $CO_2$; the alkylene group of the alkyleneoxy constituent contains from 2 to about 4 carbon atoms; n is an integer of from 2 to about 300; m is 1 when A is O, S, or $CO_2$, and 2 when A is N; x is an integer of from 1 to about 5; and the product of n times m times x (n·m·x) is from 2 to about 400. Also disclosed is a process for preparing alkyleneoxy fugitive tints.

U.S. Pat. No. 4,284,729 (Cross et al.), the disclosure of which is totally incorporated herein by reference, discloses d process for coloring thermosetting resins, made by polyaddition reaction of a nucleophile with an electrophile, with a polymeric liquid reactive coloring agent suitable for incorporation in the resin with the formation of covalent bonds, said coloring agent having the formula

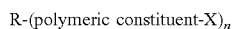

wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; and n is an integer of from 1 to about 6; and X is selected from —OH, —$NH_2$, and —SH, said coloring agent being added in an amount sufficient to provide coloration of said thermosetting resin.

U.S. Pat. No. 4,132,840 (Hugl et al.), the disclosure of which is totally incorporated herein by reference, discloses polyurethane plastics that are dyed with dyestuffs of the formula

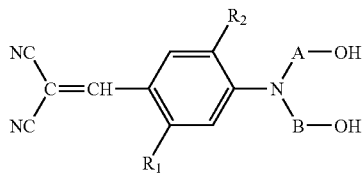

wherein $R_1$ denotes hydrogen, halogen, optionally substituted $C_1$–$C_4$ alkyl, optionally substituted $C_1$–$C_4$ alkoxy, and optionally substituted $C_1$–$C_4$ alkylcarbonylamino and $R_2$ denotes hydrogen, optionally substituted $C_1$–$C_4$ alkyl, and optionally substituted $C_1$–$C_4$ alkoxy, while A and B denote optionally branched alkylene chains which can be identical or different and preferably have 2 to 6 carbon atoms, with formation of covalent bonds, in that the dyestuffs are added before or during the polyaddition reaction to the reaction mixture of polyol and polyisocyanate or to one of the components.

U.S. Pat. No. 3,994,835 (Wolf et al.), the disclosure of which is totally incorporated herein by reference, discloses dispersions of dyestuffs which contain at least one free amino or hydroxyl group capable of reacting with isocyanates under the conditions of polyaddition and liquids in which the dyes are soluble to an extent less than 2 percent which are suitable for the production of colored polyurethane foams. The dye dispersions can be added before or during the polyaddition reaction.

U.S. Pat. No. 5,270,363 (Kluger et al.), the disclosure of which is totally incorporated herein by reference, discloses a colorant for natural or synthetic resinous or polymeric materials, having the formula A-[$SO_2$—N($R_2$)—Y]$_{1-4}$ wherein $R_2$ is selected for example from hydrogen, methyl, cyclohexyl, phenyl or Y; A is a nonionic metallophthalocyanine chromophore which can be substituted for example with halogen, alkyl, alkoxy, alkylthio, or aryloxy; Y is a poly(oxyalkylene) moiety containing at least three monomeric units or mixtures thereof of the formula (—RO—) wherein each R is straight or branched alkylene of 1 to 4 carbons or mixtures thereof, up to about 20 mole percent of said monomeric units may be connected by one or more linking groups such as alkyleneoxy, —NH—, or —NH-CONH—, and wherein Y can be terminated by hydrogen, or by at branch substituents, containing 1 to 3 groups or moieties selected from alkyl, cycloalkyl, acyl, or aryl; wherein any of the above recited hydrocarbon groups, moieties or substituents may themselves be substituted with up to four substituents selected, for example, from alkyl, halogen, mercapto, alkoxycarbonyl, hydroxy, alkoxy, or the like; and wherein each aliphatic hydrocarbon portion or moiety of the groups, moieties or substituents recited above contains from 1 to 20 carbons.

U.S. Pat. No. 4,912,203 (Kluger et al.), the disclosure of which is totally incorporated herein by reference, discloses thiophene based colorants useful for coloring thermoset resins such as polyurethanes being of the formula

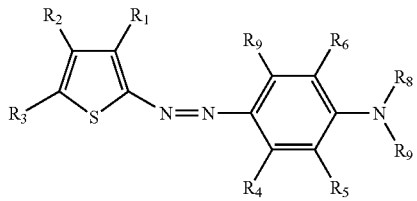

wherein $R_1$, $R_2$, and $R_3$ are selected from halogen, carboxylic acid, alkanoyl, aryloyl, carbocyclic forming polymethylene chains, alkyl, aryl, cyano, thioalkyl, dithioalkyl, thioaryl, dithioaryl, thiocyano, carboxyalkyl, carboxyaryl, amidoalkyl, amidodialkyl, amidoaryl, amidodiaryl, oxyalkyl, thioamidoalkyl, thioamidodialkyl, or hydrogen when an adjacent group is isobutyryl; $R_4$, $R_5$, and $R_7$ are selected from hydrogen alkyl, oxyalkyl, sulfonamidoalkyl, sulfonamidoaryl, amidoalkyl, amidodialkyl, amidoaryl, amidodiaryl, halogen, thioalkyl, and thioaryl; and $R_8$ and $R_9$ are selected from polyalkylene oxide, copolymers of polyalkylene oxides, and hydroxyalkylenes.

U.S. Pat. No. 4,846,846 (Rekers et al.), the disclosure of which is totally incorporated herein by reference, discloses a process for coloring polyurethane resins made by a polyaddition reaction of a polyol and an isocyanate which comprises adding to the reaction mixture before or during the polyaddition reaction a reactive coloring agent suitable for incorporation in the resin with the formation of covalent bonds, said coloring agent having the formula

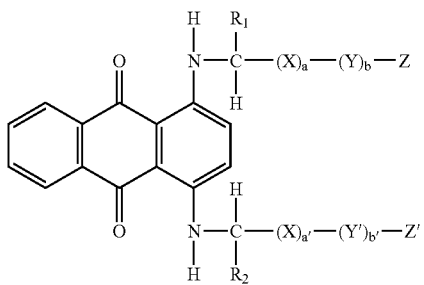

in which $R_1$ and $R_2$ are independently selected from an alkyl group having from 1 to about 12 carbon atoms, X is —$CH_2$—, a and a' are integers from 1 to about 6, and Y and Y' are independently selected from polymeric units of hydroxy alkylenes or alkylene oxide monomers selected from ethylene oxide, propylene oxide, butylene oxide, cyclohexene oxide, or glycidol, b and b' are independently either 0 or 1, and Z and Z' are reactive groups independently selected from —OH, —$NH_2$, or —SH.

U.S. Pat. No. 4,507,407 (Kluger et al.), the disclosure of which is totally incorporated herein by reference, discloses a process of coloring polyurethane resins during the production of same with reactive colorants having the formula

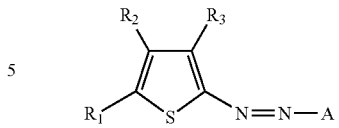

wherein $R_1$, $R_2$, $R_3$ are selected from halogen, carboxylic acid, alkanoyl, aryloyl, alkyl, aryl, cyano, sulfonylalkyl, sulfonylaryl, thioalkyl, thioaryl, sulfinylalkyl, sulfinylaryl, dithioalkyl, dithioaryl, thiocyano, amidoalkyl, amidodialkyl, oxyalkyl, oxyaryl, hydrogen, sulfonamidoalkyl, sulfonamidoaryl, sulfonamidodialkyl, sulfonamidodiaryl, carbocyclic forming polymethylene chains, sulfenamidoalkyl, sulfenamidodialkyl, sulfenamidoaryl, sulfenamidodiaryl, sulfinamidoalkyl, sulfinamidodialkyl, sulfinamidoaryl, sulfinamidodiaryl: and A is an organic dyestuff coupler that is resistant to stannous octanoate and flame retardant compounds and which has functionality through reactive substituents thereof.

U.S. Pat. No. 5,919,839 (Titterington et al.), the disclosure of which is totally incorporated herein by reference, discloses colored waxes made by reacting selected nucleophiles, including alcohol containing colorants, with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

U.S. Pat. No. 5,456,725 (Bruhnke), the disclosure of which is totally incorporated herein by reference, discloses a process for temporarily coloring a polyamide substrate whereby a poly(oxyalkylene) substituted methine colorant is applied to the substrate followed by heating the substrate with superheated steam at a temperature of 250° F. or greater, which effectively decolorizes the methine colorant.

PCT Patent Application WO 97/13816, the disclosure of which is totally incorporated herein by reference, discloses a colored material suitable for use in a hot melt ink comprising a oligomeric hot melt ink jet vehicle formed of molecules having a backbone and at least one pendant side-chain. A dyestuff is reacted onto the backbone. The material is preferably obtainable as the reaction product of an aliphatic or aromatic mono- or di-isocyanate and a hydroxyl group functional dye component, and optionally one or more other suitable material. Such suitable materials include mono- and dihydric alcohols, primary and secondary monoamines, functional amides, hydroxyl functional amines and hydroxyl containing components having a terminal unsaturated bond.

"Polymeric Colorants," J. Miley, *IUPAC Pure and Applied Chemistry*, Vol. 68, No. 7, p. 1423 (1996), the disclosure of which is totally incorporated herein by reference, discloses specific examples of polymeric colorants and how they meet functional requirements.

While known compositions are suitable for their intended purposes, a need remains for improved reactive formyl aniline compounds. In addition, a need remains for reactive formyl aniline compounds that are easily purified. Further, a need remains for reactive formyl aniline compounds that exhibit reduced toxicity. Additionally, a need remains for reactive formyl aniline compounds that are liquid at room temperature. There is also a need for reactive formyl aniline compounds that can be tailored for compatibility with various hydrophobic or hydrophilic applications. In addition, there is a need for reactive formyl aniline compounds that, when reacted with or reacted to form oligomers or polymers such as polyurethanes, polyanhydrides, or the like, resist migration and/or settling. Further, there is a need for reactive formyl aniline compounds that, when reacted with other materials, do not result in the formation of products of undesirably high molecular weight. Additionally, there is a need for reactive formyl aniline compounds that, when reacted with other materials, do not result in the formation of products with undesirable crosslinking. A need also remains for reactive formyl aniline compounds that, when reacted with other materials, form products suitable for use in phase change ink compositions. In addition, a need remains for reactive formyl aniline compounds that, when reacted with other materials, form products that, when incorporated into phase change ink compositions, exhibit reduced precipitation of the colorant from the ink. Further, a need remains for reactive formyl aniline compounds that, when reacted with other materials, form products that, when incorporated into phase change ink compositions, exhibit reduced clogging of printer heads and resulting printer failure. Additionally, a need remains for reactive formyl aniline compounds that can be used to form reactive methine colorants. There is also a need for reactive formyl aniline compounds that can be used to form reactive triarylmethane colorants.

SUMMARY OF THE INVENTION

The present invention is directed to a colorant precursor compound of the formula

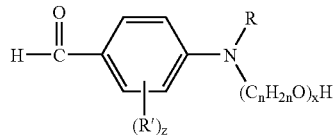

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said colorant precursor has no more than one —OH, —SH, or primary or secondary amino group per molecule. Another embodiment of the present invention is directed to a compound comprising two or more moieties of the formula

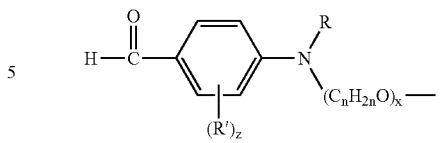

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer.

DETAILED DESCRIPTION OF THE INVENTION

The present invention is directed to a colorant precursor of the formula

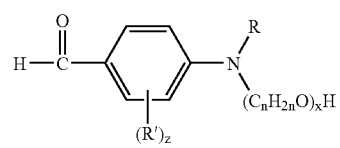

wherein R is an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, wherein the substituents on the substituted alkyl, aryl, arylalkyl, and alkylaryl groups can be (but are not limited to) halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, and the like, as well as mixtures thereof, and wherein two or more substituents can be joined together to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit (the alkylene oxide units can each have different numbers of carbon atoms; for example, the polyalkylene oxide chain can comprise a mixture of repeat ethylene oxide, propylene oxide, and/or butylene oxide units), and typically is from about 2 to about 18, and preferably from about 2 to about 4, although the value of n can be outside of these ranges, and x is an integer representing the number of repeat alkylene oxide units, and typically is from about 2 to about 100, and preferably from about 5 to about 20, although the value of x can be outside of these ranges, wherein said colorant has no more than one —OH, —SH, or —NHR" group (i.e., primary or secondary amino group) per molecule, wherein R" is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group.

If desired, various substituents (shown as R' groups on the structure) can be present on the central phenyl moiety of the structure to affect the color of a colorant, such as a methine colorant or a triarylmethane colorant, prepared from the precursor molecule. From 1 to 4 of such substituents can be present, which can be the same as each other or different from each other. Examples of such substituents include (but are not limited to) halogen atoms, such as fluorine, chlorine, bromine, and iodine, alkyl groups, typically with from 1 to about 25 carbon atoms, such as methyl, ethyl, and the like, alkoxy groups, typically with from 1 to about 25 carbon atoms, such as methoxy groups, ethoxy groups, and the like, nitrile groups, nitro groups, amide groups, such as an acetamido group or the like, including (but not limited to) those of the general formula

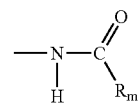

wherein $R_m$ is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group, such as an acetamido group or the like, sulfonamide groups, including (but not limited to) those of the formula

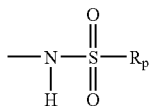

wherein $R_p$ is a hydrogen atom, an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as benzyl or the like, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, such as tolyl or the like, and wherein the substituents on the substituted alkyl, aryl, arylalkyl, and alkylaryl groups can be (but are not limited to) those indicated hereinabove for the R group, or the like.

It should be noted that the R group can also be joined to the central phenyl moiety to form a ring; for example, compounds of the formulae

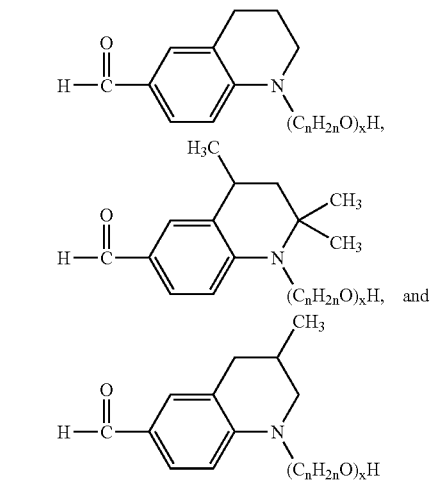

are within the scope of the above formula.

Materials of this formula can be prepared according to the following reaction scheme (in which, for purposes of simplicity, no R' groups are shown):

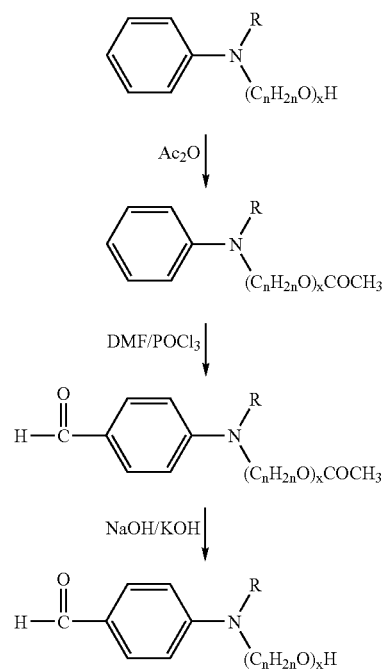

More specifically, the terminal hydroxy group in the polyalkoxy aniline is first converted to an acetate group to protect this functionality in subsequent reaction steps. This conversion can be performed via an acetylation reaction, wherein the polyalkoxy aniline is first heated, typically to a temperature of from about 90 to about 150° C., although the temperature can be outside of this range, and subjected to vacuum to remove water, and subsequently reacted with acetic anhydride, if desired in the presence of an optional esterification catalyst, such as dibutyl tin laurate, para-toluene sulfonic acid, 1-methylimidazole, or the like, as well as mixtures thereof, under reflux conditions, typically at a temperature of from about 90 to about 150° C., although the temperature can be outside of this range, and an inert atmosphere. The acetic anhydride typically, although not necessarily, is present in a slight molar excess relative to the polyalkoxy aniline. Thereafter, excess acetic acid (generated as a reaction byproduct) and acetic anhydride can be removed by vacuum distillation to yield the acetylated product.

The acetylated product is then admixed with a formylating agent, such as dimethyl formamide, N-methyl formamide (which can be prepared as disclosed in, for example, *Organic Synthesis Collective Volume* 3, p 98, 1955, John Wiley and Sons, ISBN 0 471 40953 7, the disclosure of which is totally incorporated herein by reference), or the like, with the formylating agent typically, although not necessarily, present in a molar excess of from about 5 to about 20 percent, and cooled to about 0° C., followed by dropwise addition of $POCl_3$ in a molar excess amount at temperatures of no more than about 5° C., and subsequent warming to room temperature. Thereafter, the reaction mixture is heated, typically to a temperature of from about 50 to about 100° C., although the temperature can be outside of this range, and a base, such as sodium hydroxide, potassium hydroxide, calcium hydroxide, calcium oxide, mixtures thereof, or the like is added slowly, with the base typically present in a molar excess of from about 1.1 moles of base per every one mole of acetylated product to about 10 moles of base per every one mole of acetylated product, although the amount can be outside of these ranges, followed by separation of the acetylated and formylated product via a separatory funnel.

The acetylated and formylated product is then deprotected to convert the acetate end group back to a hydroxy group. The acetylated and formylated product is admixed with a mixture of sodium hydroxide and potassium hydroxide, with the sodium hydroxide/potassium hydroxide mixture typically present in a molar excess of from about 1.1 moles of base per every one mole of acetylated and formylated product to about 10 moles of base per every one mole of acetylated and formylated product, although the amount can be outside of these ranges, and heated, typically to a temperature of from about 60 to about 120° C., although the temperature can be outside of these ranges, typically for a period of about 3 hours, although the time can be greater or lesser than this amount, followed by addition of water until the cloud point is reached, i.e., when the acetylated and formulated product separates from the water (typically an amount of water on a molar basis that is from about 0.75 to about 3 times as much water as acetylated and formylated product) and continued heating, typically at a temperature of from about 60 to about 100° C., although the temperature can be outside of this range. The product mixture is then allowed to phase separate, and the deprotected formylated product can be recovered via a separatory funnel.

If desired, the cycle of admixing with 0.75 to 3 times as much water as product, heating, and separating can be repeated to remove salts to a desired level. If desired, vacuum can be employed for further removal of water from the product.

Starting materials of the formula

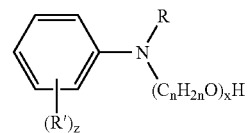

are commercially available from, for example Henkel Corporation, Mauldin, S.C. For example, a material of this formula wherein n is 2 and x is 10 is available. From the same company is also available as SO-7864 a similar material wherein both ethylene oxide and propylene oxide groups are randomly distributed through the polyalkylene oxide chain in an average molar ratio of about 3.5 moles of ethylene oxide groups to 6.5 moles of propylene oxide groups. Materials of this formula can also be prepared by, for example, obtaining a commercially available aniline of the formula

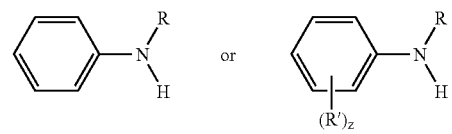

and reacting it with an epoxide compound having the desired number of carbon atoms in the presence of a Lewis acid or a base. More specifically, if one wants, for example, a compound wherein n is 3 (i.e., a polypropylene oxide substituted compound), one can react the aniline with an epoxide compound of the formula

If one wants a compound wherein n is 2 (i.e., a polyethylene oxide substituted compound), one can react the aniline with an epoxide compound of the formula

The molar ratio of epoxide compound to N-alkyl aniline is such that the desired number of repeat alkylene oxide units per N-alkyl aniline molecule is obtained; for example, if it is desired to have a molecule with an average of about 10 repeat alkylene oxide units (i.e., x=10), the molar ratio of epoxide compound to N-alkyl aniline is about 10:1.

The reaction can take place in the presence of a catalyst which is either a base, such as potassium hydroxide or the like, or a Lewis acid, such as $BF_3$ etherate or the like. The catalyst is present in any desired or effective amount, in one embodiment at least about 0.01 mole of catalyst per every one mole of aniline, in another embodiment at least about 0.05 mole of catalyst per every one mole of aniline, and in yet another embodiment at least about 0.1 mole of catalyst per every one mole of aniline, and in one embodiment no more than about 0.3 mole of catalyst per every one mole of aniline, in another embodiment no more than about 0.2 mole of catalyst per every one mole of aniline, and in yet another embodiment no more than about 0.1 mole of catalyst per every one mole of aniline, although the relative amounts can be outside of these ranges.

Further information regarding these kinds of reactions is disclosed in, for example, Preparation I of U.S. Pat. No. 4,091,034, Example 1 of U.S. Pat. No. 4,167,510, Example I of U.S. Pat. No. 4,400,320, and Example 1A of U.S. Pat. No. 5,290,921, the disclosures of each of which are totally incorporated herein by reference.

The material of the formula

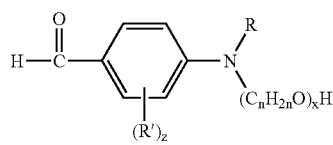

can, if desired, be reacted with a suitable active methylene compound to form an active methine colorant. Suitable active methylene compounds have an active —$CH_2$— group or a group enolizable to a —$CH_2$— group that can react with the aldehyde group to form methine colorants. The reaction takes place by heating the two reactants in approximate molar equivalent amounts, if desired in the presence of an optional condensation catalyst such as ammonium acetate or the like, in a catalytic amount typically of from about 0.05 to about 1 part by weight catalyst per every 1 part by weight formylated polyalkoxylated aniline, typically to a temperature of from about 50 to about 100° C., although the temperature can be outside of these ranges, to extract water and yield the desired methine colorant. The reaction can be run neat, or, if desired, an optional solvent such as ethanol, toluene, or the like can also be employed. If desired, vacuum can be applied to shift the reaction equilibrium toward the product. Examples of suitable reactions are as follows (in which, for purposes of simplicity, no R' groups are shown):

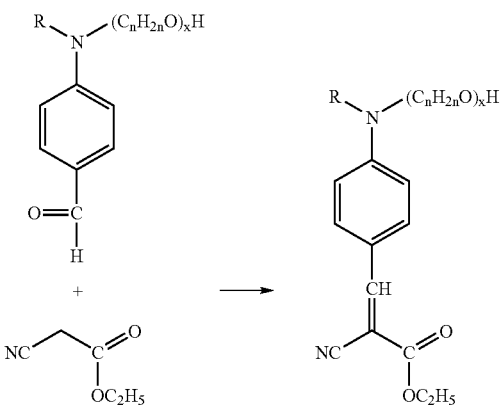

-continued

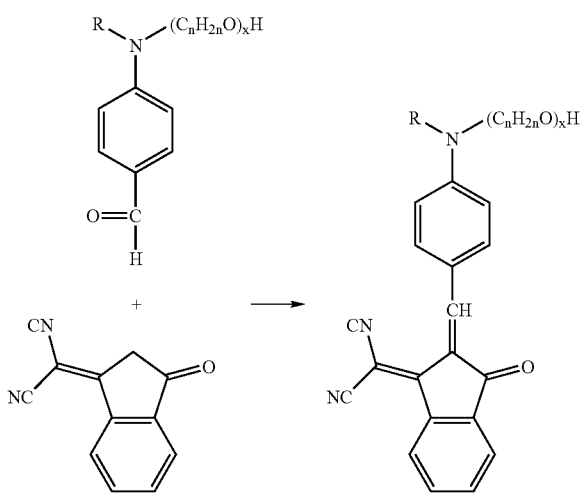

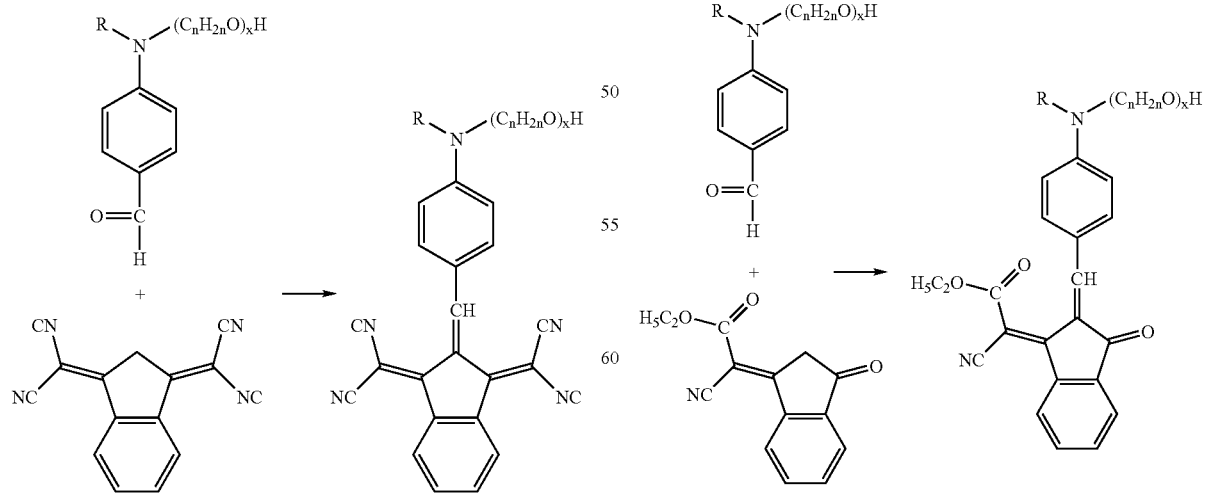

-continued

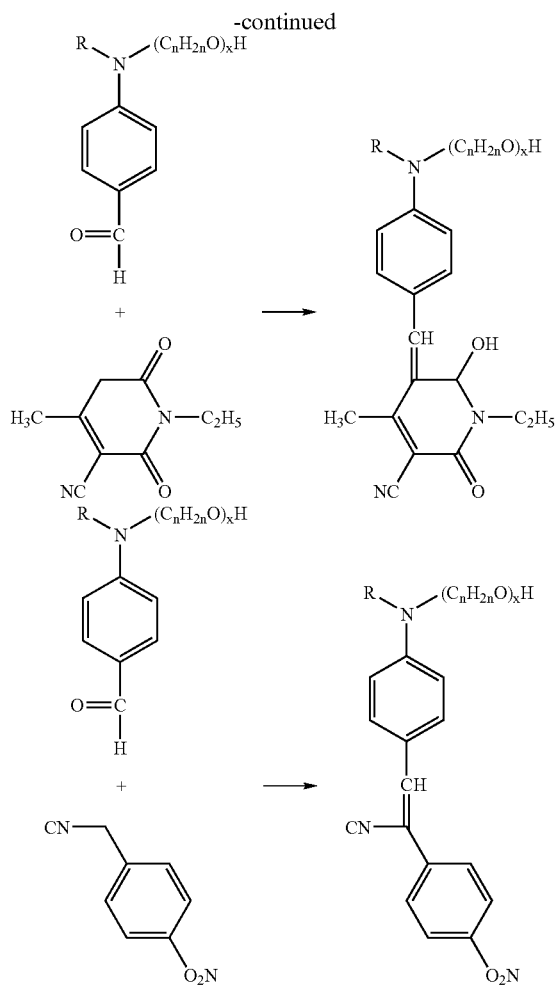

and the like.

The resulting methine colorants are of the general formula

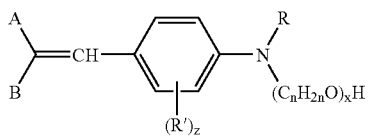

wherein R, R', z, n, and x are as defined hereinabove, wherein A and B can, if desired, be joined together to form a ring, wherein A and B each, independently of the other, can be (but are not limited to) hydrogen atoms, halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, alkyl groups (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in one embodiment with no more than about 50 carbon atoms, and in another embodiment with no more than about 25 carbon atoms, although the number of carbon atoms can be outside of these ranges, alkoxy groups (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl portion of the alkoxy group), in one embodiment with at least 1 carbon atom, and in one embodiment with no more than about 50 carbon atoms, and in another embodiment with no more than about 25 carbon atoms, although the number of carbon atoms can be outside of these ranges, aryl groups (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 20 carbon atoms, and in another embodiment with no more than about 15 carbon atoms, although the number of carbon atoms can be outside of these ranges, aryloxy groups (including unsubstituted and substituted aryloxy groups, and wherein hetero atoms, such as oxygen, nitrogen, sulfur, silicon, phosphorus, and the like either may or may not be present in the aryl portion of the aryloxy group), in one embodiment with at least 5 carbon atoms, and in another embodiment with at least about 6 carbon atoms, and in one embodiment with no more than about 20 carbon atoms, and in another embodiment with no more than about 15 carbon atoms, although the number of carbon atoms can be outside of these ranges, arylalkyl groups (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 25 carbon atoms, although the number of carbon atoms can be outside of these ranges, such as benzyl or the like, arylalkyloxy groups (including unsubstituted and substituted arylalkyloxy groups, and wherein hetero atoms, such as oxygen, nitrogen, sulfur, silicon, phosphorus, and the like either may or may not be present in either or both of the alkyl portion and the aryl portion of the arylalkyloxy group), in one embodiment with at least about 6 carbon atoms, and in another embodiment with at least about 7 carbon atoms, and in one embodiment with no more than about 50 carbon atoms, and in another embodiment with no more than about 25 carbon atoms, although the number of carbon atoms can be outside of these ranges, alkylaryl groups (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 25 carbon atoms, although the number of carbon atoms can be outside of these ranges, such as tolyl or the like, or alkylaryloxy groups (including unsubstituted and substituted alkylaryloxy groups, and wherein hetero atoms, such as oxygen, nitrogen, sulfur, silicon, phosphorus, and the like either may or may not be present in either or both of the alkyl portion and the aryl portion of the alkylaryloxy group), in one embodiment with at least about 6 carbon atoms, and in another embodiment with at least about 7 carbon atoms, and in one embodiment with no more than about 50 carbon atoms, and in another embodiment with no more than about 25 carbon atoms, although the number of carbon atoms can be outside of these ranges, wherein the substituents on the substituted alkyl, aryl, arylalkyl, alkylaryl, alkoxy, aryloxy, arylalkyloxy, and alkylaryloxy groups can be (but are not limited to) those indicated hereinabove as suitable for the R group. Specific examples of suitable active methylene moieties include (but are not limited to) malononitrile, malononitrile dimer (2-amino-1,1,3-tricyano-1-propene) alkylcyanoacetates, alkylated and unalkylated barbituric and thiobarbituric acids, Fischers base adducts, nitrophenylacetonitriles, N-alkylcyano and carbamoyl pyridones, alkyl/aryl pyrazolones, and the like.

The material of the formula

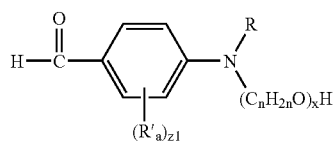

wherein each $R'_a$, independently of the others, has the same definition as R' and z1 has the same definition as z can, if desired, be reacted with one or more suitable aniline compounds to form a triarylmethane colorant. Suitable aniline compounds are of the general formulae

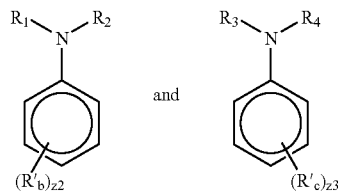

wherein each $R'_b$ and each $R'_c$, independently of the others, have the same definition as R' and z2 and z3 each have the same definition as z, wherein $R_1$, $R_2$, $R_3$, and $R_4$ each, independently of the others, is an alkyl group (including linear, branched, saturated, unsaturated, cyclic, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 50 carbon atoms, and in another embodiment with no more than about 48 carbon atoms, although the number of carbon atoms can be outside of these ranges, an aryl group (including unsubstituted and substituted aryl groups, and wherein hetero atoms, such as oxygen, nitrogen, sulfur, silicon, phosphorus, and the like either may or may not be present in the aryl group), in one embodiment with at least 5 carbon atoms, and in another embodiment with at least about 6 carbon atoms, and in one embodiment with no more than about 50 carbon atoms, and in another embodiment with no more than about 48 carbon atoms, although the number of carbon atoms can be outside of these ranges, an arylalkyl group (including unsubstituted and substituted arylalkyl groups, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, or an alkylaryl group (including unsubstituted and substituted alkylaryl groups, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 6 carbon atoms, and in another embodiment with at least about 7 carbon atoms, and in one embodiment with no more than about 50 carbon atoms, and in another embodiment with no more than about 48 carbon atoms, although the number of carbon atoms can be outside of these ranges, wherein the substituents on the substituted alkyl, aryl, arylalkyl, and alkylaryl groups can be (but are not limited to) halogen atoms, tertiary amino groups, imine groups, ammonium groups, cyano groups, pyridine groups, pyridinium groups, ether groups, ester groups, amide groups, sulfate groups, sulfonate groups, sulfide groups, sulfoxide groups, phosphine groups, phosphonium groups, phosphate groups, nitrile groups, mercapto groups, nitro groups, sulfone groups, acyl groups, azo groups, cyanato groups, and the like, as well as mixtures thereof, and wherein two or more substituents can be joined together to form a ring.

The reaction takes place by reacting in one embodiment at least about 0.9 part by mole, in another embodiment about 0.95 part by mole, and in yet another embodiment about 0.99 part by mole, and in one embodiment no more than about 1 part by mole of a compound of the formula

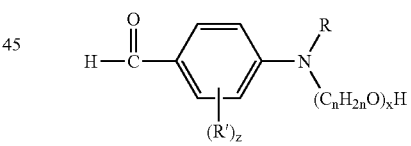

and either from about 2 to about 2.05 parts by mole of a compound of the formula (in which, for purposes of simplicity, no R' groups are shown)

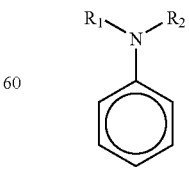

or a mixture of compounds of the formulae (in which, for purposes of simplicity, no R' groups are shown)

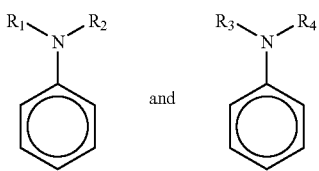

in any desired relative ratio with respect to each other, wherein the number of parts by mole of compound containing $R_1$ and $R_2$ plus the number of parts by mole of compound containing $R_3$ and $R_4$ equals from about 2 to about 2.05 in the presence of a mineral acid that promotes dehydration, such as sulfuric acid, phosphoric acid, or the like. The mineral acid is present in any desired or effective amount, in one embodiment at least about 1 mole of mineral acid per every one mole of compound of the formula

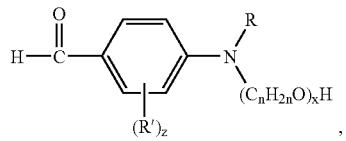

and in another embodiment at least about 1.5 moles of mineral acid per every one mole of compound of the formula

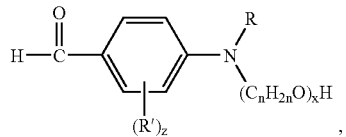

and in one embodiment no more than about 3 moles of mineral acid per every one mole of compound of the formula

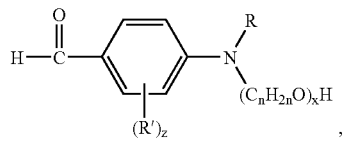

and in another embodiment no more than about 2 moles of mineral acid per every one mole of compound of the formula

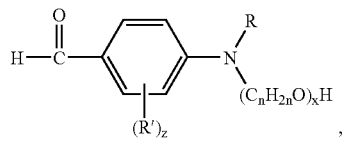

although the relative amounts can be outside of these ranges.

The reactants are heated to any desired or effective temperature, in one embodiment at least about 70° C., and in another embodiment at least about 80° C., and in one embodiment no more than about 100° C., and in another embodiment no more than about 95° C., although the temperature can be outside of these ranges.

The reactants are allowed to react for any desired or effective period of time, in one embodiment at least about 1 hour, and in another embodiment at least about 3 hours, and in one embodiment no more than about 24 hours, and in another embodiment no more than about 6 hours, although the period of time can be outside of these ranges.

The reaction proceeds in two steps, as follows (in which, for purposes of simplicity, no R' groups are shown):

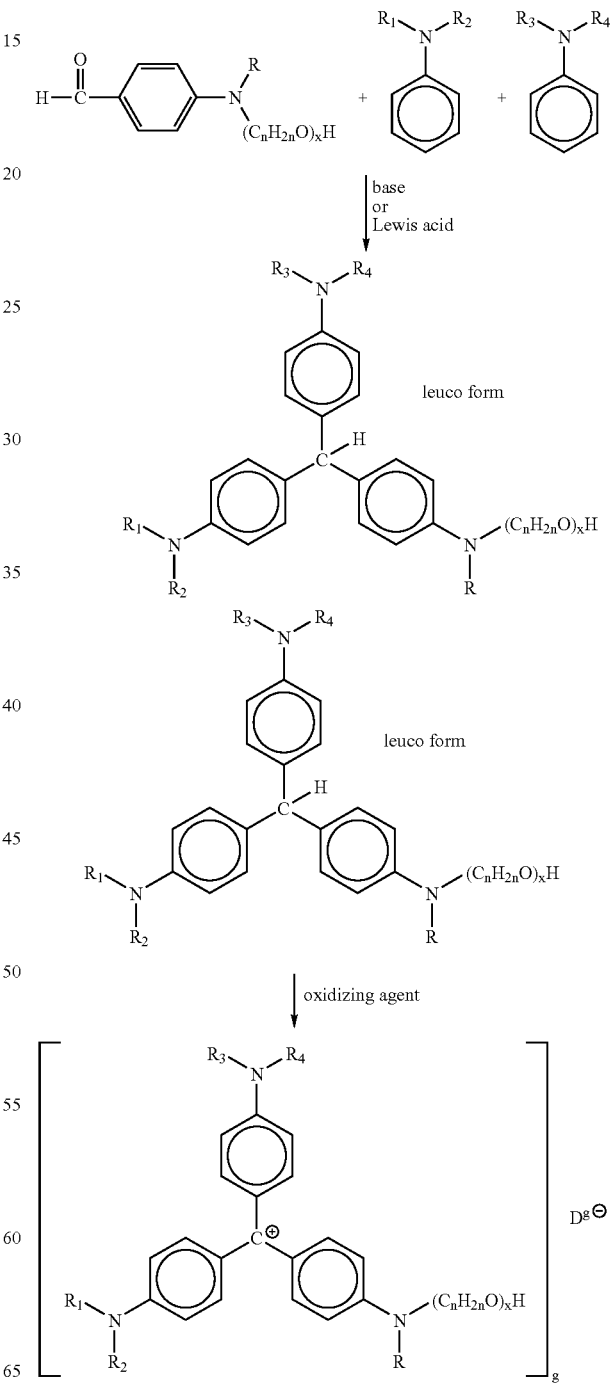

Any desired or effective oxidizing agent commonly employed to prepare triarylmethanes can be used, such as chloranil, hydrogen peroxide, benzoquinone, or the like, as well as mixtures thereof. The oxidizing agent is present in any desired or effective relative amount, in one embodiment at least about 1 mole of oxidizing agent per every one mole of the leuco form of the colorant, and in one embodiment no more than about 5 moles of oxidizing agent per every one mole of the leuco form of the colorant, and in another embodiment no more than about 2 moles of oxidizing agent per every one mole of the leuco form of the colorant, although the relative amounts can be outside of these ranges.

The oxidizing agent and the leuco form of the colorant are heated to any desired or effective temperature, in one embodiment at least about 25° C., in another embodiment at least about 55° C., and in yet another embodiment at least about 100° C., and in one embodiment no more than about 125° C., in another embodiment no more than about 115° C., and in yet another embodiment no more than about 105° C., although the temperature can be outside of these ranges.

The oxidizing agent and the leuco form of the colorant are allowed to react for any desired or effective period of time, in one embodiment at least about 5 minutes, in another embodiment at least about 30 minutes, and in yet another embodiment at least about 60 minutes, and in one embodiment no more than about 12 hours, in another embodiment no more than about 6 hours, and in yet another embodiment no more than about 2 hours, although the period of time can be outside of these ranges.

The reaction product mixture can then be neutralized with a base, such as NaOH or the like, and the salt layer can then be separated from the product layer. Optionally, the colorant can be subsequently washed with more water to reduce the salt layer to the level desired.

The resulting triarylmethane colorant is of the formula

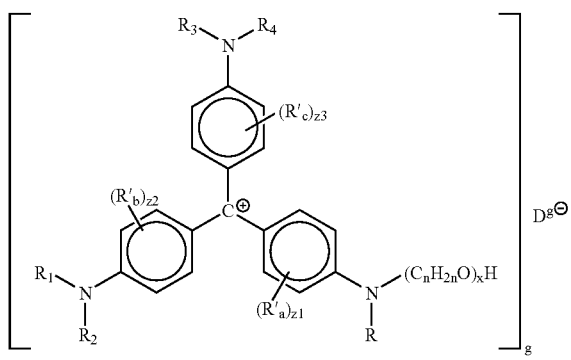

wherein each $R'_a$, $R'_b$, and $R'_c$, independently of the others, is a halogen atom, an alkyl group, an alkoxy group, a nitrile group, a nitro group, an amide group, or a sulfonamide group, z1, z2, and z3 each, independently of the others, is an integer of 0, 1, 2, 3, or 4, n, and x are as defined hereinabove, D is an anion corresponding to the mineral acid used in the reaction to synthesize the colorant, and g represents the charge on the anion, typically being 1, 2, 3, 4, or the like.

Colorant precursors of the present invention can be reacted with various atoms, groups of atoms, monomers, oligomers, or polymers to form various monomers, oligomers, or polymers having covalently bonded thereto a colorant precursor according to the present invention. For example, a compound can be formed comprising two or more moieties of the formula

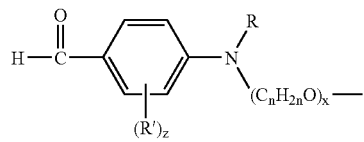

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units, wherein said moieties each contain no —OH groups, —SH groups, or primary or secondary amino groups, said moieties being linked by a central atom or group of atoms or bonded to a polymer.

Examples of groups of atoms, monomers, oligomers, or polymers which can be prepared with the precursors of the present invention include urethane isocyanate-derived monomers, oligomers, or polymers, urea isocyanate-derived monomers, oligomers, or polymers, urethane/urea isocyanate-derived monomers, oligomers, or polymers, anhydride monomers, oligomers, or polymers, such as styrene-maleic anhydride monomers, oligomers, or polymers, ester/polyester monomers, oligomers, or polymers, carbonate/polycarbonate monomers, oligomers, or polymers, and the like. Urethane isocyanate-derived monomers, oligomers, or polymers, urea isocyanate-derived monomers, oligomers, or polymers, and urethane/urea isocyanate-derived monomers, oligomers, or polymers having covalently bonded thereto a colorant precursor according to the present invention are generally the reaction product of a colorant precursor according to the present invention and an isocyanate. Urethane isocyanate-derived monomers, oligomers, or polymers, urea isocyanate-derived monomers, oligomers, or polymers, and urethane/urea isocyanate-derived monomers, oligomers, or polymers having covalently bonded thereto a colorant precursor prepared from a precursor according to the present invention can be prepared by, for example, processes such as those disclosed in U.S. Pat. Nos. 5,919,839; 3,994,835; 4,132,840; 4,751,254; 5,290,921; 5,270,363; 4,912,203; 4,846,846; 4,507,407; 4,284,729; 5,864,002; PCT Patent Application WO 97/13816; J. H. Saunders and K. C. Frisch's "Polyurethanes Part I, Chemistry" published by Interscience of New York, N.Y. in 1962; and Olin Chemicals' Luxate® IM isophorone diisocyanate technical product information sheet; the disclosures of each of which are totally incorporated herein by reference. Further information on isocyanate-derived resins is disclosed in, for example, U.S. Pat. Nos. 5,782,966; 5,750,604; 5,827,918; 5,830,942; 5,994,453; 6,180,692; 6,018,005; 6,028,138; 6,048,925; 6,057,399; and 5,783,658; the disclosures of each of which are totally incorporated herein by reference.

For example, a monoisocyanate reacts with an alcohol to form a urethane as follows:

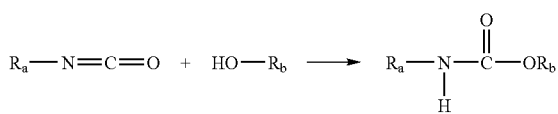

Diisocyanates react similarly; for example, isophorone diisocyanate reacts with two moles of alcohol to form a diurethane as follows:

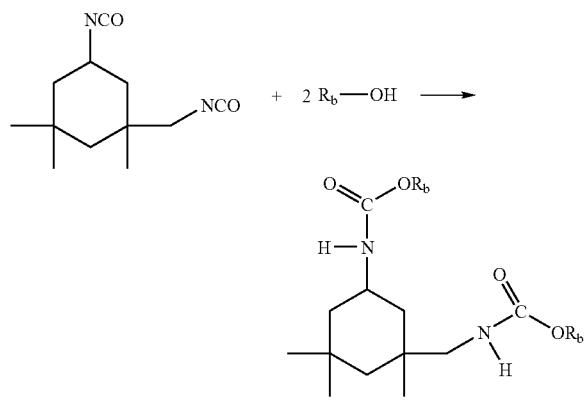

Monomeric, oligomeric, and polymeric materials can be prepared when HO—$R_b$ is a colorant precursor according to the present invention.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane compounds by condensing alcohols with isocyanates can be used to prepare polymeric materials having attached thereto colorant precursors according to the present invention. Typically (although not necessarily), the reaction is carried out at elevated temperatures (for example, from about 60 to about 160° C.) in the presence of an optional urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol-substituted or amine-substituted antioxidant typically remaining. The reactants can be added together in any order and/or added to the reaction as physical mixtures. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are totally incorporated herein by reference, which provide further explanation of this chemistry.

Anhydride resins having covalently bonded thereto a colorant precursor according to the present invention are generally the reaction product of a monomeric colorant precursor according to the present invention and an anhydride. Anhydride resins having covalently bonded thereto a colorant precursor according to the present invention can be prepared as disclosed in, for example, U.S. Pat. Nos. 6,110,264 and 6,322,624, the disclosures of each of which are totally incorporated herein by reference. Examples of suitable anhydrides include cyclic anhydrides, such as alkylsuccinic anhydrides, alkenylsuccinic anhydrides, and the like, as well as mixtures thereof. Specific examples include (but are not limited to) maleic anhydride, 2,3-diphenylmaleic anhydride, trimellitic anhydride, 2-phenylglutaric anhydride, homophthalic anhydride, isatoic anhydride, n-methylisatoic anhydride, 5-chloroisatoic anhydride, phthalic anhydride, 3,3',4,4'-benzophenone tetracarboxylic dianhydride, 4-methylphthalic anhydride, 4,4'-(hexafluoroisopropylidine)-diphthalic anhydride, 3,6-difluorophthalic anhydride, 3,6-dichlorophthalic anhydride, 4,5-dichlorophthalic anhydride, tetrafluorophthalic anhydride, tetrachlorophthalic anhydride, tetrabromophthalic anhydride, 3-hydroxyphthalic anhydride, 1,2,4-benzenetricarboxylic anhydride, 3-nitrophthalic anhydride, 4-nitrophthalic anhydride, 1,2,4,5-benzenetetracarboxylic dianhydride, diphenic anhydride, 1,8-naphthalic anhydride, 4-chloro-1,8-naphthalic anhydride, 4-bromo-1,8-naphthalic anhydride, 4-amino-1,8-naphthalic anhydride, 3-nitro-1,8-naphthalic anhydride, 4-nitro-1,8-naphthalic anhydride, 4-amino-3,6,disulfo-1,6-disulfo-1,8-napthalic anhydride dipotassium salt, 1,4,5,8-naphthalenetetracarboxylic dianhydride, 3,4,9,10-perylenetetracarboxylic dianhydride, cis-1,2,3,6-tetrahydrophthalic anhydride, cis-5-norbornene-endo-2,3-dicarboxylic anhydride, endo-bicyco[2,2,2]oct-5-ene-2,3-dicarboxylic anhydride, cantharidin, methyl-5-norbornene-2,3-dicarboxylic anhydride, exo-3,6,epoxy-1,2,3,6-tetrahydrophthalic anhydride, s-acetylmercaptosuccinic anhydride, diacetyl tartaric anhydride, bicyclo[2,2,2]octo-7-ene-2,3,5,6-tetracarboxylic dianhydride, citraconic anhydride, 2,3-dimethylmaleic anhydride, 1-cyclopentene-1,2-dicarboxylic anhydride, 3,4,5,6-tetrahydrophthalic anhydride, bromomaleic anhydride, dichloromaleic anhydride, 1,4,6,7,7-hexachloro-5-norbornene-2,3-dicarboxylic anhydride, cis-aconitic anhydride, glutaric anhydride, 3-methylglutaric anhydride, 2,2-dimethylglutaric anhydride, 3,3-dimethylglutaric anhydride, 3-ethyl-3-methylglutaric anhydride, 3,3tetramethyleneglutaric anhydride, hexafluoroglutaric anhydride, 3,5-diacetyltetrahydropyran-2,4,6-trione, ethylenediaminetetraacetic dianhydride, diethylenetriaminepentaacetic dianhydride, diglycolic anhydride, succinic anhydride, methylsuccinic anhydride, 2,2-dimethylsuccinic anhydride, isobuteneylsuccinic anhydride, 2-octen-1-ylsuccinic anhydride, octadecenylsuccinic anhydride, 3-oxabicyclo[3,1,0]hexane-2,4-dione, cis-1,2-cyclohexanedicarboxylic anhydride, trans-1,2-cyclohexanedicarboxylic anhydride, hexahydro-4-methylphthalic anhydride, itaconic anhydride, 2-dodecen-1-ylsuccinic anhydride, and the like, as well as mixtures thereof. For example, colored styrene-maleic anhydride resins having covalently bonded thereto a colorant precursor according to the present invention are generally the reaction product of a monomeric colorant precursor according to the present invention and styrene-maleic anhydride. Copolymers of anhydrides with styrene, butadiene, methoxyvinylether, ethylene, alpha-olefins, mixtures thereof, and the like, are all suitable examples of polymeric materials with which the monomeric colorants prepared from precursors of the present invention can be reacted to form colored polymeric materials. Specific examples of suitable copolymers include (but are not limited to) poly(methyl vinyl ether-maleic acid), poly(acrylic acid-co-maleic acid), poly(vinyl chloride-co-vinyl-acetate-co-maleic acid), poly(ethylene-maleic anhydride), poly(maleic anhydride-1-octadecene), poly(styrene-co-maleic anhydride), poly(methyl vinyl ether-maleic anhydride), poly(ethylene-co-ethyl acrylate-co-maleic anhydride), poly(ethylene-co-vinyl acetate)-graft-maleic anhydride, polyethylene-graft-maleic anhydride, polypropylene-graft-maleic anhydride, and the like, as well as mixtures thereof.

The monomeric precursor compounds of the present invention, i.e., those containing only one moiety of the formula

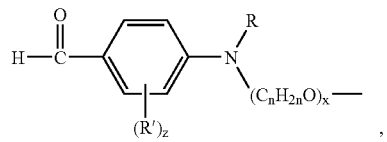

have no more than one —OH, —SH, or —NHR" group per molecule, wherein R" is a hydrogen atom, an alkyl group, an aryl group, an arylalkyl group, or an alkylaryl group. By this it is meant that, for example, if the molecule has one —OH group, it has no —SH groups, no —NHR" groups, and no additional —OH groups. Because the precursor compounds of the present invention have one and only one of these groups, in some embodiments of the invention various advantages can be achieved. For example, when these precursors or colorants prepared therefrom are reacted with other materials to form resins, there is no formation of products of undesirably high molecular weight and no undesired crosslinking. Some advantages are particularly desirable for phase change ink applications. For example, when these precursors or colorants prepared therefrom are reacted with other materials to form resins and when these resins are incorporated into a phase change ink, precipitation of the resin from the ink is reduced; more specifically, when multifunctional precursors or colorants prepared therefrom, rather that the chain terminating precursors of the present invention or colorants prepared therefrom, are employed in reactions of di- or tri-isocyanates and monohydric alcoholic species, some higher molecular weight species are produced which can be insoluble in the ink base, often resulting or being manifested as a precipitate in the prepared material and/or the final ink. In addition, when these precursors or colorants prepared therefrom are reacted with other materials to form resins and when these resins are incorporated into a phase change ink, clogging of printheads and the printer failure accompanying such clogging can be reduced.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Phase Separation of N-Ethyl Aniline Ethoxylate

To a 100 milliliter beaker equipped with a magnetic stirrer was added about 50 milliliters of POE(10) N-ethyl aniline, of the formula

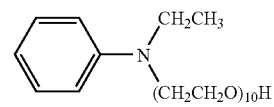

(obtained from Henkel Corp, Mauldin, S.C.) and about 65 milliliters of deionized water. The mixture was placed on a magnetic stirring hot plate and stirring and heating were initiated. When the temperature reached 90° C., the beaker was removed from heat and stirring and was allowed to cool slowly. After several minutes, separation of layers began to occur, and after about 2 hours, the temperature had returned to room temperature and the separation was complete. A separation of the two layers was visually observed, and separation of the layers was performed with a separatory funnel.

Acetylation/Protection

To a 1,000 milliliter flask equipped with a vacuum adapter and magnetic stirrer was added about 400.0 grams of POE (10) N-ethyl aniline. The flask was placed in a 140° C. oil bath under vacuum with stirring for about 1 hour. The vacuum source was then removed and about 88.3 milliliters of acetic anhydride (obtained from Aldrich Chemical Co., Milwaukee, Wis.) and 10 drops of 1-methylimidazole (obtained from Aldrich Chemical Co.) were added to the flask. A nitrogen atmosphere and reflux condenser were then introduced, and the mixture was allowed to heat at 140 to 150° C. for about 4 hours. Thereafter, the condenser and nitrogen atmosphere were removed and a vacuum was gradually applied with the temperature at about 130° C. to remove excess acetic anhydride and acetic acid (generated as a reaction byproduct). Infrared spectroscopy showed that the OH band (3200–3600 cm$^{-1}$) in the POE(10) N-ethyl aniline had disappeared in the product, and a carbonyl band (1720–1770 cm$^{-1}$) had appeared in the product, indicating the success of the acetylation reaction.

Formylation

The acetylated product thus formed was transferred to a 1,000 milliliter 4-necked flask equipped with a Trubore stirrer, constant pressure addition funnel, nitrogen atmosphere, and thermometer. About 128.0 grams of dimethyl formamide (obtained from Aldrich Chemical Co.) was added to the acetylated product, stirring was initiated, and the mixture was cooled to about 0° C. About 160.0 grams of POCl$_3$ (obtained from Aldrich Chemical Co.) were added to the addition funnel and added dropwise to the reaction mixture at a rate to keep the temperature below 5° C. (about 5 hours). The reaction mixture was then stirred for 1 additional hour at 5° C., set at room temperature overnight, and then heated to 80° C. for about 2 hours. Thereafter, about 500 grams of 50 percent sodium hydroxide (solid material obtained from Aldrich Chemical Co.) in water was added slowly at a rate to keep the temperature below 80° C. Upon addition of all of the sodium hydroxide solution, the mixture was poured into a 1,000 milliliter separatory funnel and allowed to phase separate. The bottom layer (comprising salt and water) was then drained and discarded.

Deacetylation/Deprotection

The acetylated and formylated product thus formed was then transferred back into a 1,000 milliliter 4-necked flask equipped with a Trubore stirrer, nitrogen atmosphere, and thermocouple temperature controller. About 280 grams of 50 percent sodium hydroxide (obtained from Aldrich Chemical Co.) in water and about 90 grams of 50 percent potassium hydroxide in water (solid material obtained from Aldrich Chemical Co.) were added, and the reaction mixture was heated to 100° C. and maintained at that temperature for about 3 hours. Thereafter, about 72 grams of 50 percent potassium hydroxide (obtained from Aldrich Chemical Co.) in water and 600 grams of deionized water were added, and heating was continued at 100° C. for an additional hour. The product mixture was then poured into a 2,000 milliliter separatory funnel and allowed to phase separate overnight. The water/salt layer was then removed, yielding the formylated hydroxy-terminated product of the formula

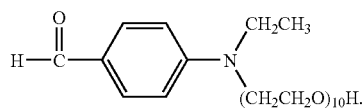

EXAMPLE II

Acetylation/Protection

To a 1,000 milliliter flask equipped with a vacuum adapter and magnetic stirrer was added about 200.0 grams of a random POE (3.5) POP (6.5) N-ethyl aniline, of the formula

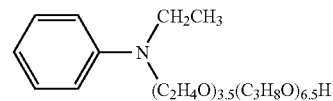

wherein 3.5 represents the average number of repeat polyoxyethylene units per molecule and 6.5 represents the average number of repeat polyoxypropylene units per molecule, and wherein the polyoxyethylene and polyoxypropylene units are randomly mixed within the polyoxyalkylene chain (obtained as SO-7864 from Henkel Corp., Mauldin, S.C.). the flask was placed in a 140° C. oil bath under vacuum with stirring for about 1 hour, the vacuum source was then removed and about 36.5 grams of acelic anhydride (obtained from Aldrich Chemical Co., Milwaukee, Wis.) and 10 drops of 1-methylimidazole (obtained from Aldrich Chemical Co.) were added to the flask. A nitrogen atmosphere and reflux condenser were then introduced, and the mixture was allowed to heat at 130 to 135° C. for about 3 hours. Thereafter, a vacuum was gradually applied with the temperature at about 130° C. to remove excess acetic acid (generated as a reaction byproduct) and acetic anhydride. Infrared spectroscopy showed that the OH band (3200–3600 cm$^{-1}$) in the POE/POP N-ethyl aniline had disappeared in the product and a carbonyl band (1720–1770 cm$^{-1}$) had appeared in the product indicating the success of the acelylation reaction.

Formylation

About 195.0 grams of the acetylated product thus formed was transferred to a 1,000 milliliter 4-necked flask equipped with a Trubore stirrer, constant pressure addition funnel, nitrogen atmosphere, and thermometer. About 51.0 grams of dimethyl formamide (obtained from Aldrich Chemical Co.) was added to the acetylated product, stirring was initiated, and the mixture was cooled to about 0° C. About 63.8 grams of POCl$_3$ (obtained from Aldrich Chemical Co.) were added to the addition funnel and added dropwise to the reaction mixture at a rate to keep the temperature below 5° C. (about 3 hours). The reaction mixture was then stirred for 0.5 additional hour at 5° C., set at room temperature overnight, and then heated to 80° C. for about 2 hours. Thereafter, about 275 grams of deionized water was added and enough 50 percent sodium hydroxide solution in water (solid sodium hydroxide obtained from Aldrich Chemical Co.) was added slowly at a rate to keep the temperature below 80° C. Upon addition of all of the sodium hydroxide solution, the mixture was poured into a 1,000 milliliter separatory funnel and allowed to phase separate. The bottom layer (comprising salt and water) was then drained and discarded.

Deacetylation/Deprotection

The acetylated and formylated product thus formed was then transferred back into a 1.000 milliliter 4-necked flask equipped with a TEFLON® coated magnet an a stirring hot plate. About 70 grams of sodium hydroxide and 23 grams of potassium hydroxide (obtained from Aldrich Chemical Co.) was dissolved in 400 milliliters of deionized water, and the reaction mixture was heated to 100° C. and maintained at that temperature for about 2 hours, the product mixture was then poured into a 2,000 milliliter separatory funnel and allowed to phase separate overnight. The wafer/salt layer was then removed. The product layer was transferred to a 2 liter beaker, 400 grams of deionized water were added, and the mixture was neutralized to a pH of about 7 with sulfuric acid (obtained from Aldrich Chemical Co.). The mixture was then heated to about 70° C. and transferred back to the separatory funnel and allowed to separate overnight. The water/salt layer was discarded, yielding the formylated hydroxy-terminated product of the formula

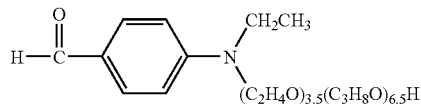

the product was stripped of any remaining residual water on a rotary evaporator. Infrared spectroscopy showed that the OH band (3200–3600 cm$^{-1}$) in the POE(3.5) POP (6.5) N-ethyl aniline was again present in the product, and a carbonyl band (1720–1770 cm$^{-1}$) of the formyl group was present in the product.

EXAMPLE III

Reaction Product of Benzophenonetetracarboxylic Dianhydride, Octophenol Ethoxylate, and Formylated Hydroxy-terminated Precursor To a 1,000 milliliter three-neck resin kettle equipped with a Trubore stirrer, N$_2$ inlet, and thermocouple-temperature controller is added 150.0 grams (0.93 equivalents) of benzophenonetetracarboxylic dianhydride (available from Aldrich Chemical Co., Milwaukee, Wis.) and 211.6 grams (0.83 equivalents) of IGEPAL CA-210 (octylphenol ethoxylate, available from Rhone-Poulenc Co., Cranbury, N.J. Note: TRITON X15 octylphenol ethoxylate, available from Union Carbide Chemicals and Plastics Company Inc., Danbury, Conn., can be directly substituted for IGEPAL CA-210 in this reaction.). The reaction mixture is heated to 150° C. with stirring under nitrogen. After 1.0 hours at 150° C. the temperature is increased to 170° C. and held at that temperature for 3.5 hours. A formylated hydroxy-terminated precursor (0.098 equivalents) prepared as described in Example II is then added and allowed to react for 3 hours. The final resin product is then poured into aluminum molds and allowed to cool and harden.

EXAMPLE IV

The process of Example III is repeated except that the formylated hydroxy-terminated precursor prepared as described in Example I is used instead of the formylated hydroxy-terminated precursor prepared as described in Example II. It is believed that similar results will be obtained.

EXAMPLE V

Reaction Product of Octylphenol Ethoxylate, Isophorone Diisocyanate, and Formylated Hydroxy-terminated Precursor 525.0 grams (4.73 equivalents) of isophorone diisocyanate (available from Bayer Corp., Pittsburgh, Pa.) and 1.5 grams of dibutyltindilaurate catalyst (available from Aldrich Chemical Co., Milwaukee, Wis.), followed by 1,150 grams (4.52 equivalents) of octylphenol ethoxylate (IGEPAL CA-210 octylphenol ethoxylate, available from Rhone-Poulenc Co., Cranbury, N.J.), are added to a 3,000 milliliter three-neck resin kettle equipped with a Trubore stirrer, N$_2$ atmosphere inlet, and a thermocouple-temperature controller. The reaction mixture is heated to 135° C. with stirring under nitrogen. After 2.0 hours at 135° C., 0.210 equivalents of formylated hydroxy-terminated precursor prepared as described in Example II above are added and the reaction mixture is heated for approximately 2 hours. An additional 11.0 grams (0.0433 equivalents) of octylphenol ethoxylate are then added and the reaction mixture is heated at 150° C. for approximately 2 hours. An FT-IR of the product is obtained to ensure that all of the isocyanate (NCO) functionality has been consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies are used to confirm that the isocyanate has been consumed. The diurethane reaction product is then poured into aluminum molds and allowed to cool and harden.

EXAMPLE VI

The process of Example V is repeated except that the formylated hydroxy-terminated precursor prepared as described in Example I is used instead of the formylated hydroxy-terminated precursor prepared as described in Example II. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A colorant precursor compound of the formula

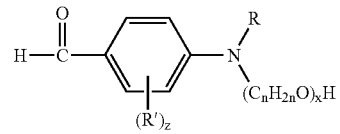

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit, and x is an integer representing the number of repeat alkylene oxide units and is at least 10, wherein said colorant precursor has no more than one —OH, —SH, or primary or secondary amino group per molecule.

2. A colorant precursor compound according to claim 1 wherein R is an alkyl group with at least one carbon atom and with no more than about 50 carbon atoms, an aryl group with at least about 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms.

3. A colorant precursor compound according to claim 1 wherein R is ethyl.

4. A colorant precursor compound according to claim 1 wherein n is at least about 2 and wherein n is no more than about 18.

5. A colorant precursor compound according to claim 1 wherein n is no more than about 4.

6. A colorant precursor compound according to claim 1 wherein x is no more than about 100.

7. A colorant precursor compound according to claim 1 wherein x is no more than about 20.

8. A colorant precursor compound according to claim 1 wherein z is an integer of 1, 2, 3, or 4 and each R', independently of the others, is a fluorine atom, a chlorine atom, a bromine atom, an iodine atom, an alkyl group with at least one carbon atom and with no more than about 25 carbon atoms, an alkoxy group with at least one carbon atom and with no more than about 25 carbon atoms, a nitrile group, a nitro group, an amide group of the formula

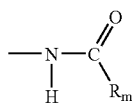

wherein $R_m$ is a hydrogen atom, an alkyl group with at least 1 carbon atom and with no more than about 50 carbon atoms, an aryl group with at least 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms, or a sulfonamide group of the formula

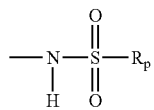

wherein $R_p$ is a hydrogen atom, an alkyl group with at least 1 carbon atom and with no more than about 50 carbon atoms, an aryl group with at least 5 carbon atoms and with no more than about 50 carbon atoms, an arylalkyl group with at least about 6 carbon atoms and with no more than about 50 carbon atoms, or an alkylaryl group with at least about 6 carbon atoms and with no more than about 50 carbon atoms.

9. A colorant precursor compound according to claim 1 of the formula

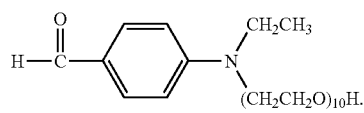

10. A composition comprising colorant precursor compounds of the formula

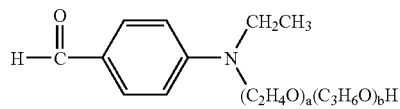

wherein a has an average value of about 3.5 and b has an average value of about 6.5.

11. A compound comprising two or more moieties of the formula

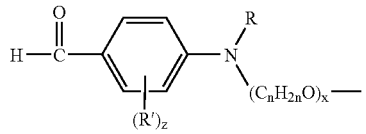

wherein R is an alkyl group, an aryl group, an arylalkyl group, or an alkylaryl group, and wherein R can be joined to the phenyl moiety to form a ring, each R', independently of the others, is a halogen atom, an alkyl group, an alkoxy group, a nitrile group, a nitro group, an amide group, or a sulfonamide group, z is an integer of 0, 1, 2, 3, or 4, n is an integer representing the number of carbon atoms in each repeat alkylene oxide unit and is at least 1, and x is an integer representing the number of repeat alkylene oxide units and is at least 1, wherein said moieties each contain no —OH groups, —SH groups, or primary or secondary amino groups, said moieties each being (a) singly bonded to a central atom or group of atoms which is an alkylene, arylene, arylalkylene, or alkylarylene group which may be either be substituted or unsubstituted, and wherein heteroatoms either may or may not be present within the alklene, arylene, arylalkylene, or alkylarylene group, or (b) singly bonded to a polymer.

12. A compound according to claim 11 wherein the moieties are each singly bonded to a group of atoms which is derived from an isocyanate, said group of atoms being an alkylene, arylene, arylalkylene, or alkylarylene group wich may be either substituted or unsubstituted, and wherein heteroatoms either may or may not be preset within the alkylene, arylene, arylalkylene or alkylarylene group.

13. compound which is the reaction product of a colorant precursor according to claim 1 and a monoisocyanate, said compound having the formula

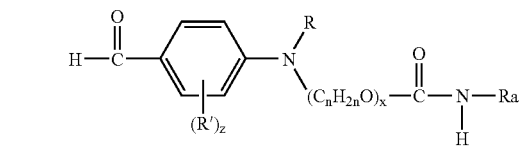

wherein $R_a$ represents a group originally associated with the monoisocyanate $R_aNCO$ and is an alkyl, aryl, arylalkyl, or alkylaryl group, wherein $R_a$ may be either substituted or unsubstituted, and wherein heteroatoms either may or may not be present within $R_a$.

14. A compound according to claim 13 wherein the monoisocyanate is octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyante; or mixtures thereof.

15. A compound according to claim 12 wherein the isocyanate is a diisocyanate, said compound having the formula

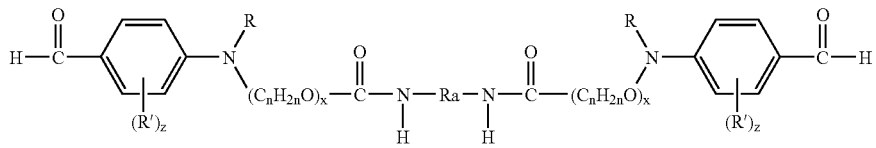

wherein $R_a$ represents a group originally associated with the diisocyanate $R_a(NCO)_2$ and is as an alkylene, arylene, arylalkylene, or alkylarylene group which may be either substituted or unsubstituted, and wherein heteroatoms either may or may not be present in the alkylene, arylene, arylalkylene, or alkylarylene group.

16. A compound according to claim 15 wherein the diisocyanate is isophorone diisocyanate; toluene diisocyanate; diphenylmethane-4,4'-diisocyanate; hydrogenated diphenylmethane-4,4'-diisocyanate; tetra-methyl xylene diisocyanate; hexamethylene-1,6-diisocyanate; hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; cyclohexylene diisocyanate or an isomer thereof; a uretidione dimer of hexamethylene-1,6-diisocyanate; or mixtures thereof.

17. A compound according to claim 12 wherein the isocyanate is a triisocyanate, said compound having the formula

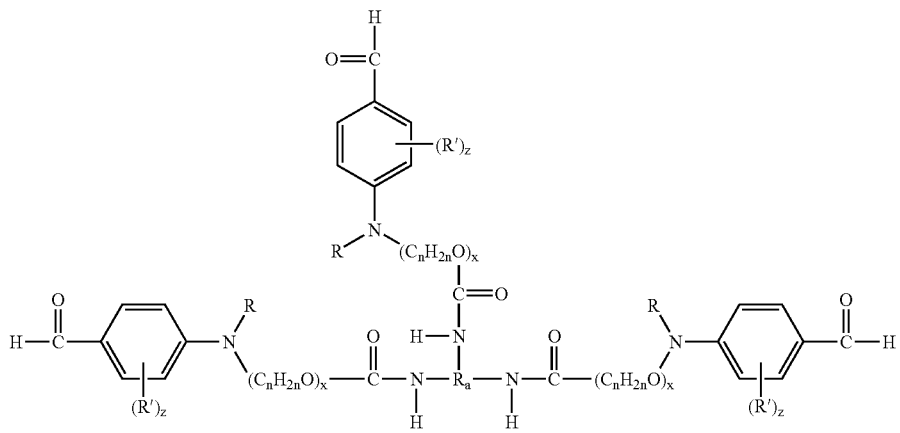

wherein $R_a$ represents a group originally associated with the triisocyanate $R_a(NCO)_3$ and is an alkylene, arylene, arylalkylene, or alkylarylene group which may be either substituted or unsubstituted, and wherein heteroatoms either may or may not be present in the alkylene, arylene, arylalkylene, or alkylarylene group.

18. A compound according to claim 11 wherein the moieties are each singly bonded to a polymer.

19. A compound according to claim 18 wherein the polymer is a polyurethane.

20. A compound according to claim 18 wherein the polymer is an anhydride polymer.

21. A compound according to claim 20 wherein the anhydride polymer is a polymer of a cyclic anhydride.

22. A compound according to claim 20 wherein the anhydride polymer is a polymer of an alkylsuccinic anhydride or an alkenylsuccinic anhydride.

23. A compound according to claim 20 wherein the anhydride polymer is a polymer of maleic anhydride, 2,3-diphenylmaleic anhydride, trimellitic anhydride, 2-phenylglutaric anhydride, homophthalic anhydride, isatoic anhydride, n-methylisatoic anhydride, 5-chloroisatoic anhydride, phthalic anhydride, 3,3',4,4'-benzophenone tetracarboxylic dianhydride, 4-methylphthalic anhydride, 4,4'-(hexafluoroisopropylidine)-diphthalic anhydride, 3,6-difluorophthalic anhydride, 3,6-dichlorophthalic anhydride, 4,5-dichlorophthalic anhydride, tetrafluorophthalic anhydride, tetrachlorophthalic anhydride, tetrabromophthalic anhydride, 3-hydroxyphthalic anhydride, 1,2,4-benzenetricarboxylic anhydride, 3-nitrophthalic anhydride, 4-nitrophthalic anhydride, 1,2,4,5-benzenetetracarboxylic dianhydride, diphenic anhydride, 1,8-naphthalic anhydride, 4-chloro-1,8-naphthalic anhydride, 4-bromo-1,8-naphthalic anhydride, 4-amino-1,8-naphthalic anhydride, 3-nitro-1,8-naphthalic anhydride, 4-nitro-1,8-naphthalic anhydride, 4-amino-3,6, disulfo-1,6-disulfo-1,8-napthalic anhydride dipotassium salt, 1,4,5,8-naphthalenetetracarboxylic dianhydride, 3,4,9,10-perylenetetracarboxylic dianhydride, cis-1,2,3,6-tetrahydrophthalic anhydride, cis-5-norbornene-endo-2,3dicarboxylic anhydride, endo-bicyco[2,2,2]oct-5-ene-2,3dicarboxylic anhydride, cantharidin, methyl-5-norbornene-2,3-dicarboxylic anhydride, exo-3,6,epoxy-1,2,3,6-tetrahydrophthalic anhydride, s-acetylmercaptosuccinic anhydride, diacetyl tartaric anhydride, bicyclo[2,2,2]octo-7-ene-2,3,5,6-tetracarboxylic dianhydride, citraconic anhydride, 2,3-dimethylmaleic anhydride, 1-cyclopentene-1,2-dicarboxylic anhydride, 3,4,5,6-tetrahydrophthalic anhydride, bromomaleic anhydride, dichloromaleic anhydride, 1,4,6,7,7-hexachloro-5-norbornene-2,3-dicarboxylic anhydride, cis-aconitic anhydride, glutaric anhydride, 3-methylglutaric anhydride, 2,2-dimethylglutaric anhydride, 3,3-dimethylglutaric anhydride, 3-ethyl-3-methylglutaric anhydride, 3,3tetramethyleneglutaric anhydride, hexafluoroglutaric anhydride, 3,5-diacetyltetrahydropyran-2,4,6-trione, ethylenediaminetetraacetic dianhydride, diethylenetriaminepentaacetic dianhydride, diglycolic anhydride, succinic anhydride, methylsuccinic anhydride, 2,2-dimethylsuccinic anhydride, isobuteneylsuccinic anhydride, 2-octen-1-ylsuccinic anhydride, octadecenylsuccinic anhydride, 3-oxabicyclo[3,1,0]hexane-2,4-dione, cis-1,2-cyclohexanedicarboxylic anhydride, trans-1,2-cyclohexanedicarboxylic anhydride, hexahydro-4-methylphthalic anhydride, itaconic anhydride, 2-dodecen-1-ylsuccinic anhydride, or mixtures thereof.

24. A compound according to claim 20 wherein the anhydride polymer is a copolymer of an anhydride with styrene, butadiene, methoxyvinylether, ethylene, alpha-olefins, or mixtures thereof.

25. A compound according to claim 20 wherein the anhydride polymer is poly(methyl vinyl ether-maleic acid), poly(acrylic acid-co-maleic acid), poly(vinyl chloride-co-vinyl-acetate-co-maleic acid), poly(ethylene-maleic anhydride), poly(maleic anhydride-1-octadecene), poly(styrene-co-maleic anhydride), poly(methyl vinyl ether-maleic anhydride), poly(ethylene-co-ethyl acrylate-co-maleic anhydride), poly(ethylene-co-vinyl acetate)-graft-maleic anhydride, polyethylene-graft-maleic anhydride, or polypropylene-graft-maleic anhydride.

26. A compound according to claim 18 wherein the polymer is a polyisocyanate.

27. A compound according to claim 17 wherein the triisocyanate is a trimethylolpropane trimer of toluene diisocyanate, a isocyanurate trimer of toluene diisocyanate, a isocyanurate trimer of hexamethylene-1,6-diisocyanate, a isocyanurate trimer of isophorone diisocyanate, a biuret trimer of toluene diisocyanate, a biuret trimer of hexamethylene-1,6-diisocyanate, a biuret trimer of isophorone diisocyanate, or a mixture thereof.

* * * * *